Aug. 30, 1955  J. B. DICK  2,716,354
GEAR SHIFT NEUTRALIZER
Filed March 16, 1954  5 Sheets-Sheet 3
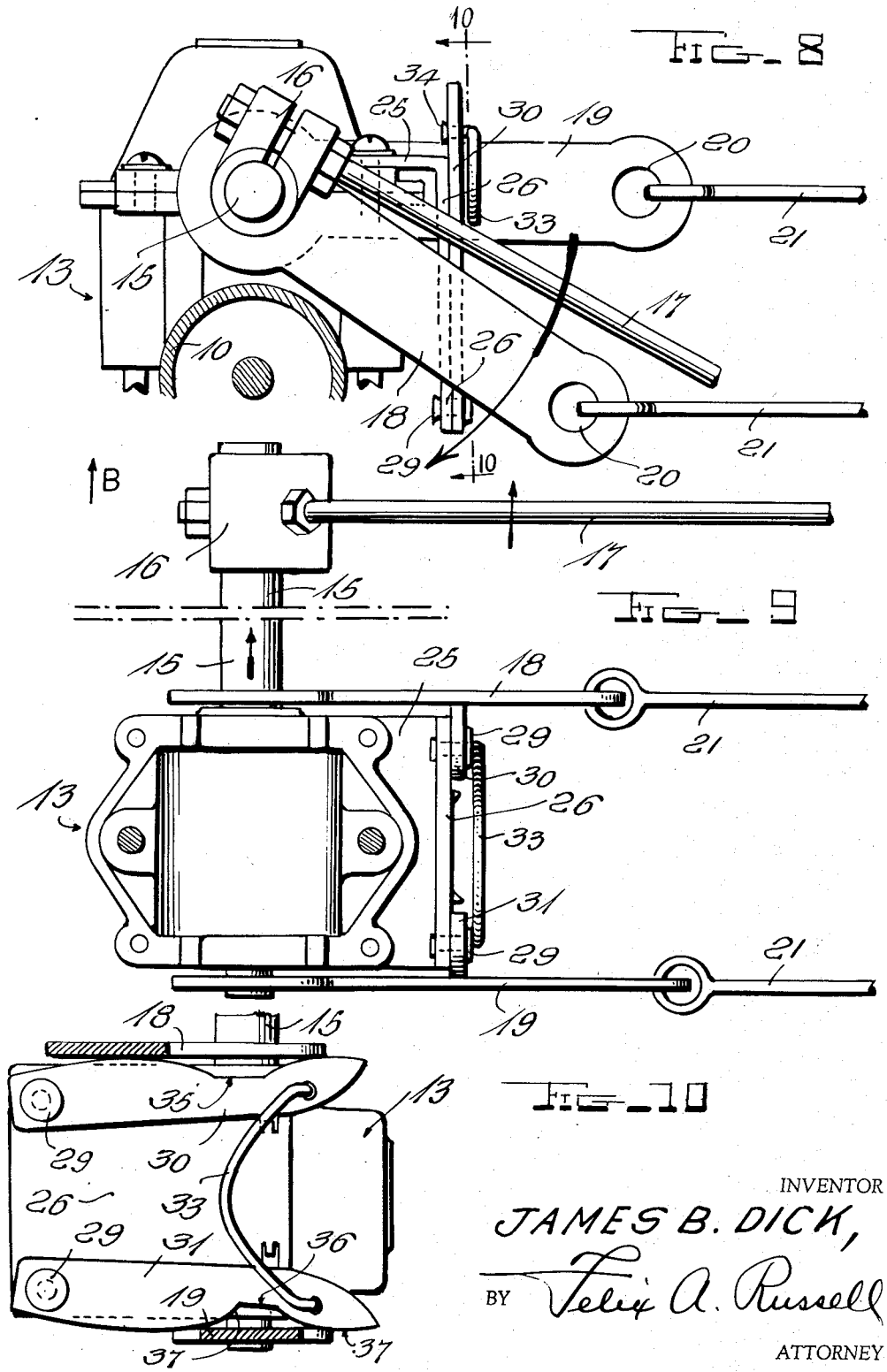
INVENTOR
JAMES B. DICK,
BY Felix A. Russell
ATTORNEY Aug. 30, 1955     J. B. DICK     2,716,354
GEAR SHIFT NEUTRALIZER
Filed March 16, 1954     5 Sheets-Sheet 4
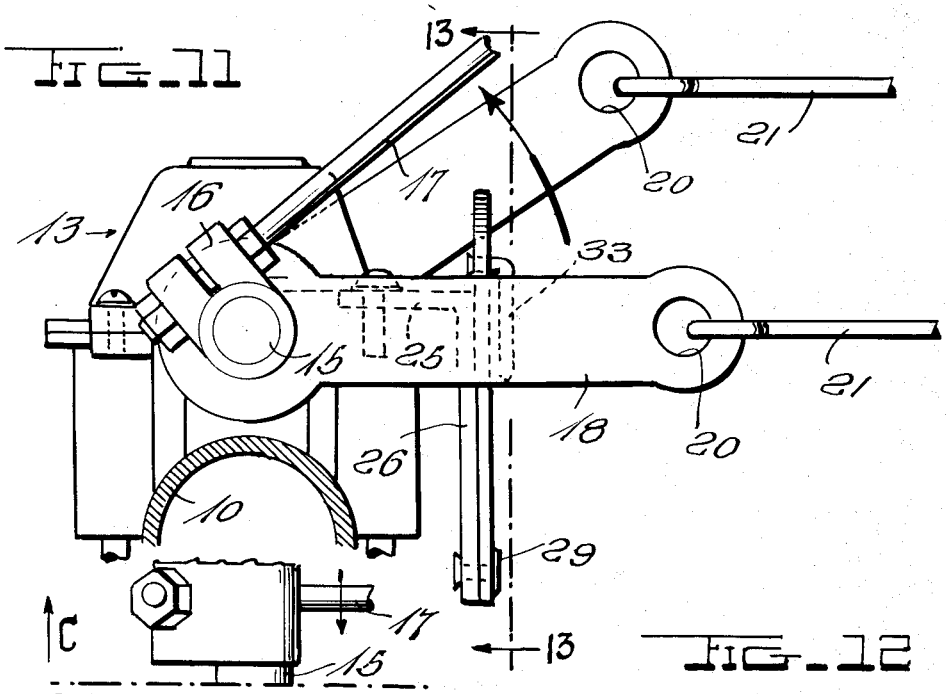
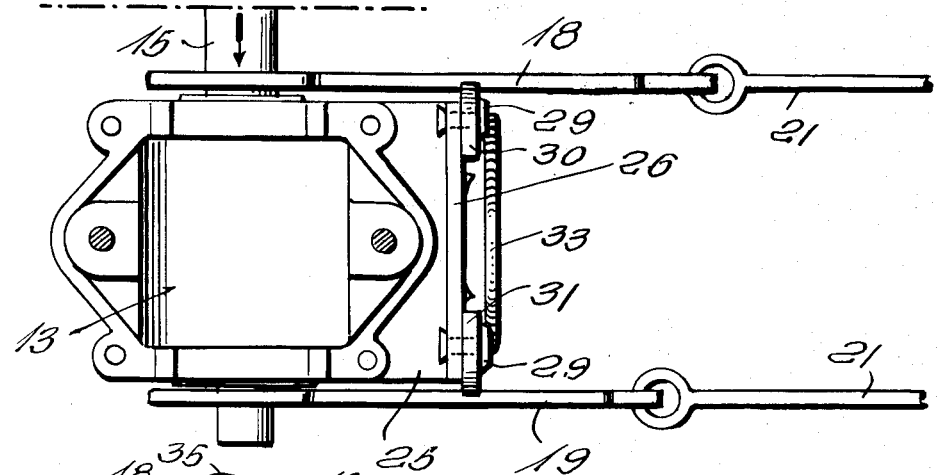
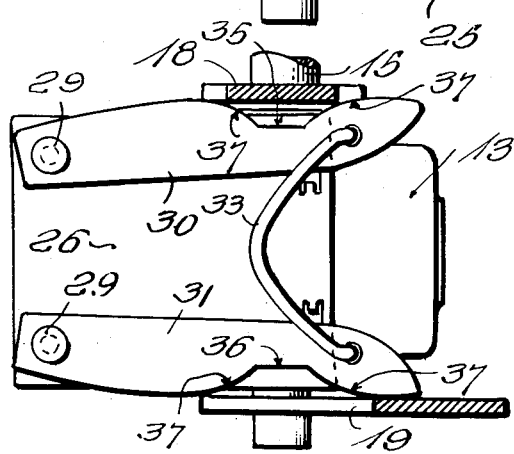
INVENTOR
JAMES B. DICK,
BY Felix A. Russell
ATTORNEY

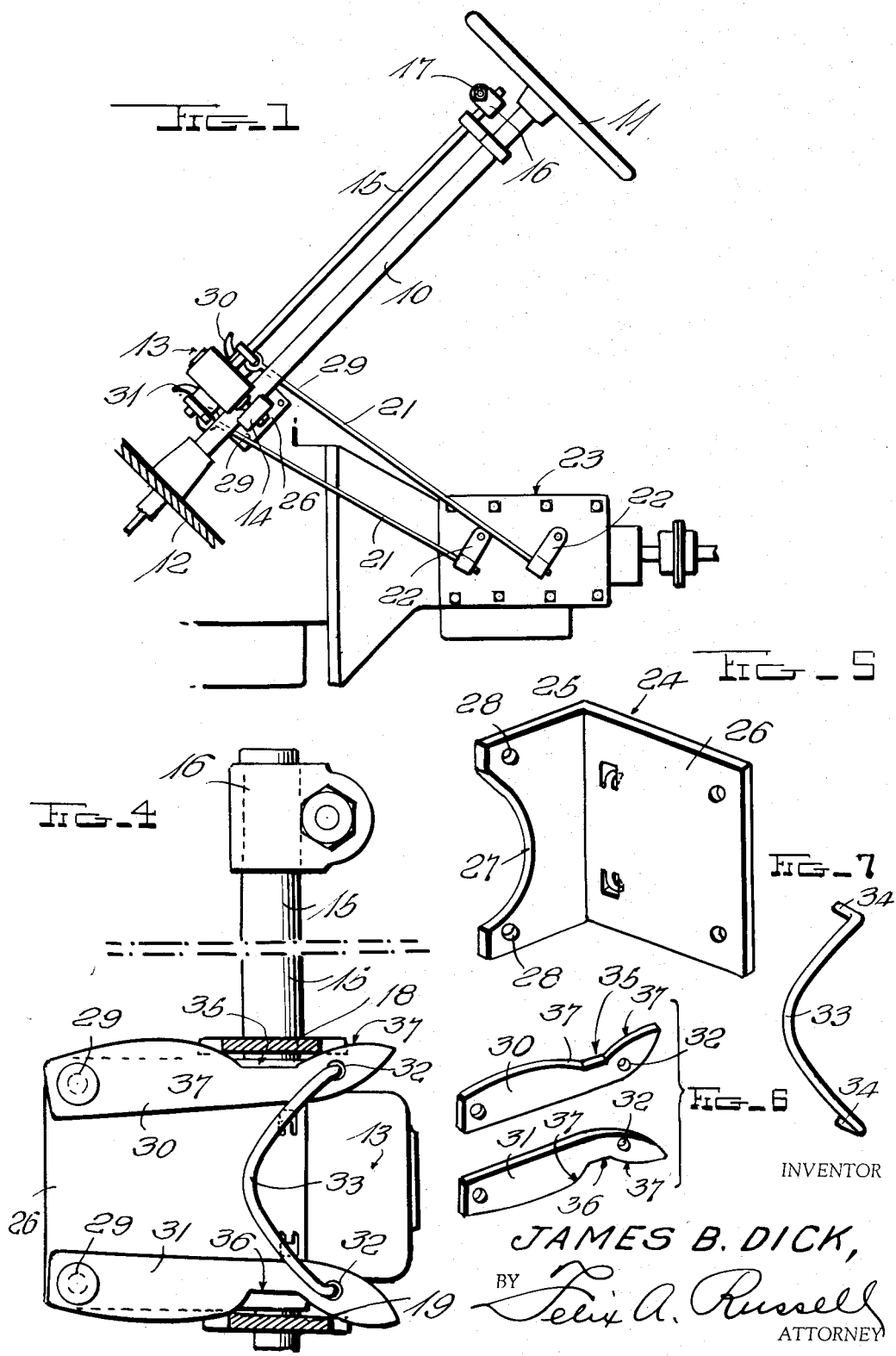

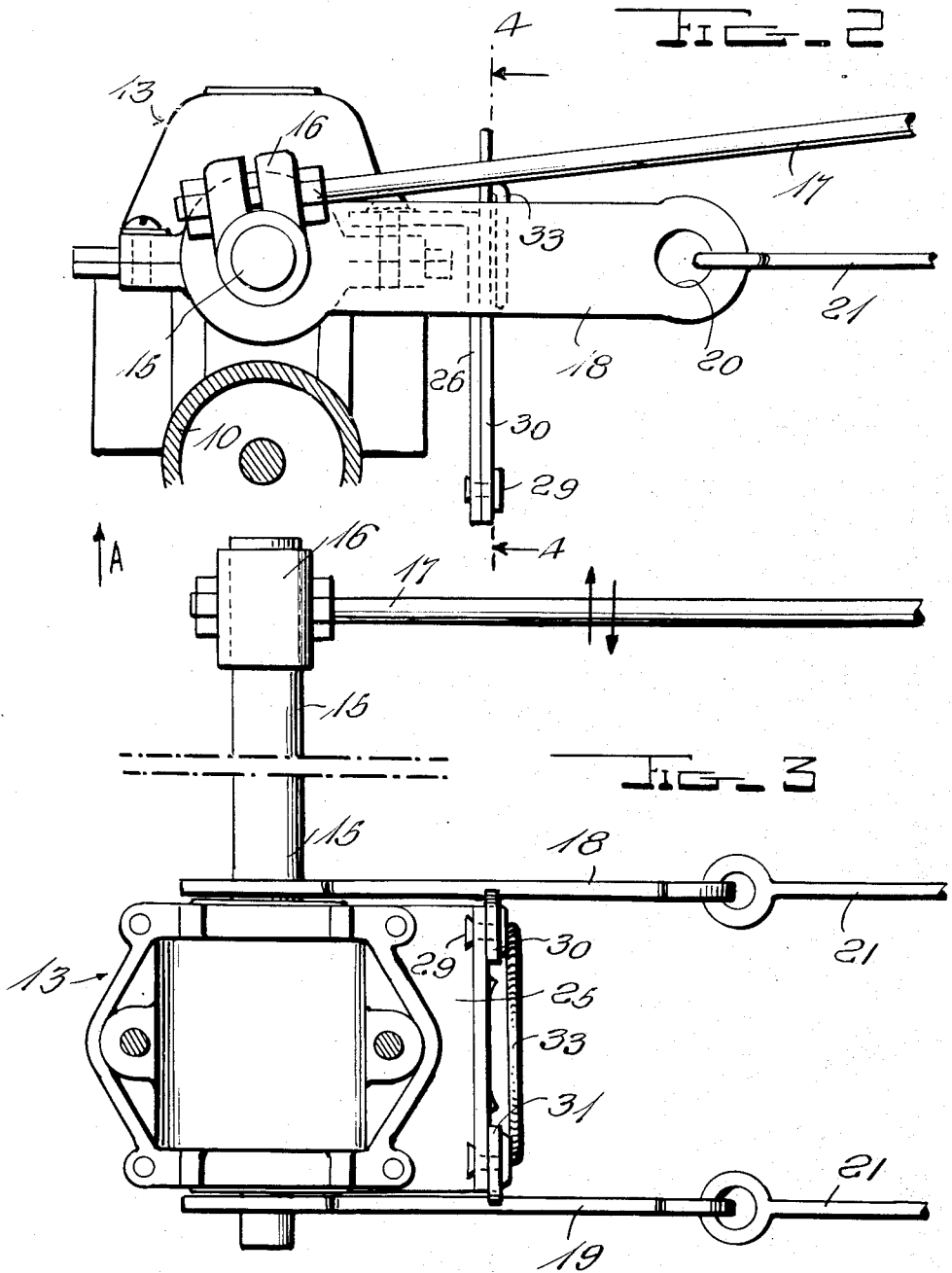

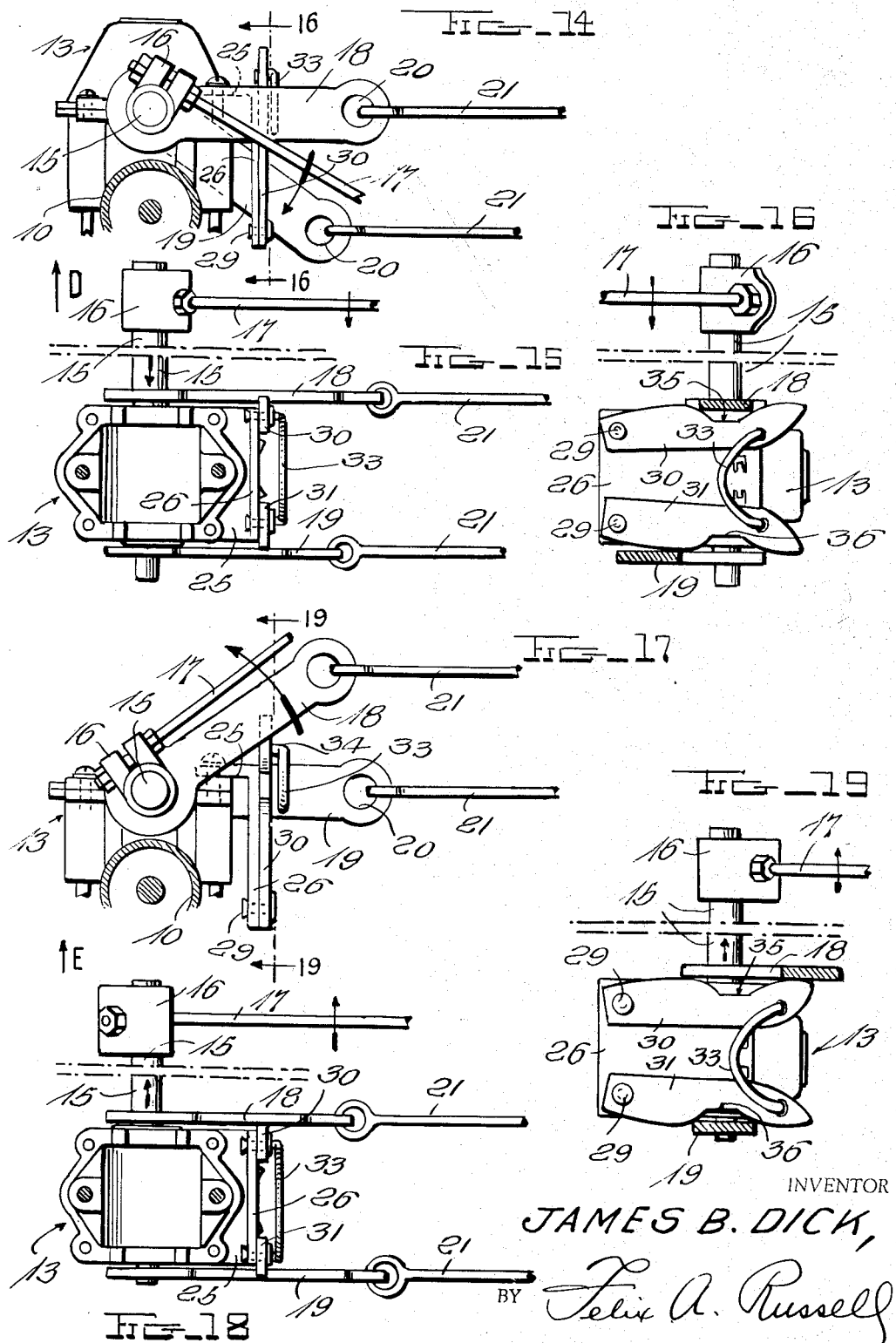

United States Patent Office 2,716,354
Patented Aug. 30, 1955

2,716,354
GEAR SHIFT NEUTRALIZER
James B. Dick, Birmingham, Ala.

Application March 16, 1954, Serial No. 416,457

6 Claims. (Cl. 74—477)

The present invention relates to a gear shift neutralizer and it consists in the combinations, constructions, and arrangements of parts herein described and claimed.

Generally there is provided an attachment for the conventional transmission shift box which is secured to the steering column of an automobile and which shift box is provided with the conventional shifting column for the actuation of its interior mechanism. As is also conventional, a pair of radially extending actuating arms form a part of the gear box and are connected at their free ends to rods or the like which, in turn, actuate the gears in the conventional transmission. The present invention comprises a bracket which is affixed to the conventional gear box aforesaid and which bracket is provided with a shelf which extends between the actuator arms and is provided, upon each side thereof with a pivoted lever adapted to bear against an adjacent actuator arm. Each of the levers is provided with a cutaway portion which normally receives the actuator arm adjacent thereto and the levers are interconnected with a novel spring which tends to urge the same outwardly, that is, to say, into frictional engagement with the adjacent actuator arms. The device is such that when either of the actuator arms is oscillated in conventional manner, the other is held in its neutral position, and, more importantly, when both of the actuator arms are returned to approximately their neutral position, they will be forced to assume an exact neutral position whereby the shifting column may be moved axially and, of course, the interior mechanisms of the shift box likewise moved in proper axial direction so that no obstructions are presented to such movement and consequently the operator of the vehicle is at all times free to move from one gear selection to another and particularly from the "second and high" positions to the "low and reverse" positions or, alternatively, from the "low and reverse" positions to the "second and high" positions, it being understood that the shift box is of conventional construction and includes parts which may become worn to a point where slight relative movements may take place therebetween even when not actuated by the conventional shift rod thus sometimes preventing the disengagement from one position to perform other and subsequent gear shift actuation.

It is accordingly an object of the invention to provide a device of the character set forth which is simple in construction, inexpensive to manufacture and yet effective and efficient in use.

Another object of the invention is to provide, in a device of the character set forth, novel means for aligning a pair of conventional actuator arms in "neutral" position.

A further object of the invention is to provide, in a device of the character set forth, a novel pair of actuator arm-engaging levers forming a part of the invention.

Still another object of the invention is to provide, in a device of the character set forth, a novel spring forming a part of the invention.

A further object of the invention is to provide a spring resistance for preventing shift box levers from accidentally "jumping out" of a high gear position.

When a motor vehicle equipped with the type of gear box herein referred to is started, the shift lever is in neutral position. At this time sudden acceleration or racing of the motor will cause the low and reverse lever to drop downwardly into low gear position, especially when the transmission shift rail springs have become weakened through use. Since the shift lug contained in the box is now in the second and high fork inside such box and not in alignment with the low and reverse fork also contained therein, it becomes impossible to engage in any other gear until the hood of the vehicle is raised and the low and reverse gear moved back to neutral position. Another object of the invention is to prevent this situation.

Other and further objects of the invention will become apparent from a reading of the following specification taken in conjunction with the drawings, in which:

Figure 1 is a side elevational view of an embodiment of the invention shown in position upon the steering column of an automobile, Figure 2 is a plan view of the device embodying the present invention showing the same as applied to the conventional transmission shift box and the actuating arms thereof, Figure 3 is an elevational view, partly broken away, of Figure 2 taken in the direction of the arrow A, Figure 4 is a fragmentary sectional view taken substantially along line 4—4 of Figure 2, Figure 5 is a perspective view of a bracket forming a part of the invention, Figure 6 is a perspective view of a pair of levers forming a part of the invention, Figure 7 is a perspective view of a spring forming a part of the invention, Figure 8 is a view similar to Figure 2 but showing the device as it appears in "low gear" position, Figure 9 is a fragmentary elevational view of Figure 8 taken in the direction of the arrow B, Figure 10 is a fragmentary sectional view taken substantially along line 10—10 of Figure 8, Figure 11 is a view similar to Figure 8 but showing the device as it appears in "second gear,"

Figure 12 is an elevational view, partly broken away, of Figure 11 taken in the direction of the arrow, Figure 13 is a fragmentary sectional view taken along line 13—13 of Figure 11, Figure 14 is a view similar to Figure 11, somewhat reduced, and showing the device as it appears in "high gear,"

Figure 15 is an elevational view, partly broken away, of Figure 14 taken in the direction of the arrow D, Figure 16 is a fragmentary sectional view taken substantially along the line 16—16 of Figure 14, Figure 17 is a view similar to Figure 14 but showing the device as it appears in "reverse gear" position, Figure 18 is an eelvational view, partly broken away, of Figure 17, taken in the direction of the arrow D, and Figure 19 is a fragmentary sectional view taken substantially along line 19—19 of Figure 17.

Referring more particularly to the drawings, there is shown therein a steering column 10 provided at its upper end with a steering wheel 11 and extending through the floor boards 12 of an automobile.

A transmission shift box is generally indicated at 13 and is affixed to the lower portion of the steering column 10 by means of a clamp 14. Extending upwardly from the transmission shift box 13 in spaced parallel relation to the steering column 10 is a shifting column 15, to whose upper end there is affixed by means of a clamp 16 or the like a laterally extending manual shift lever 17.

Extending radially from the box 13 in spaced parallel relation to each other is an upper actuator arm 18 and a lower actuator arm 19. The outer ends of the actuator arms 18 and 19 are each apertured, as indicated at 20, whereby tie rods 21 interconnect the same with lever arms 22 of a conventional transmission generally indicated at 23.

The device comprising the present invention consists of an L-shaped bracket generally designated at 24 and shown in detail in Figure 5 of the drawings. The bracket consists of a pair of integrally formed plates 25 and 26 which extend at right angles to each other, the plate 25 forming a standard for the bracket and being centrally apertured, as indicated at 27, to comply with the outer contours of the box 13 and being apertured, as indicated at 28, whereby the same may be affixed to the box 13. The plate 26 forms a shelf which extends between the actuating arms 18 and 19.

It will be seen that the shelf 26 extends in a plane which lies transversely to the planes in which the actuating arms 18 and 19 lie and that the actuating arms 18 and 19 normally extend in positions adjacent the inner end of the shelf 26, that is to say where the shelf 26 joins with the standard 25. The outer or free end portion of the shelf 26 has pivotally mounted adjacent each corner thereof by means of rivets 29 or the like a lever 30 and a lever 31. Each of the levers 30 and 31 extends to and beyond the juncture point between the shelf 26 and standard 25 and is provided with an aperture 32 adjacent the free end thereof. A generally U-shaped spring is indicated at 33 and is provided at each end thereof with a laterally extending foot 34. The levers 30 and 31 are interconnected by positioning the feet 34 in the apertures 32 so as to normally urge the levers 30 and 31 away from each other and against the actuator arms 18 and 19.

The levers 30 and 31 are each and respectively provided in their outer faces adjacent the free ends thereof with substantially U-shaped notches respectively generally indicated at 35 and 36. The notches 35 and 36 are each provided with outwardly extending convexly curved sides, as indicated at 37.

In operation, it will be apparent that when the automobile is not in motion that the transmission 23 should be in "neutral" position, that is to say with no gear therein engaged. In such "neutral" position the device of the present invention will assume the positions shown in Figures 2 to 4, inclusive. In this position it will be noted that the actuator arms 18 and 19 extend in identically the same direction and that both are centrally positioned in the notches 35 and 36, respectively. In such position, also, the shifting column 15 may be moved axially by means of the hand lever 17 so that the interior mechanism in the box 13 may be caused to oscillate either the upper arm 18 or the lower arm 19 when the hand lever 17 is oscillated one way or the other. This is the most desirable feature of the present invention and it will be apparent that the actuator arms 18 and 19 will be forced to center themselves in the notches 35 and 36, respectively due to the curvular nature of the sides of 37 of such notches and the outward pressure exerted upon each of the levers 30 and 31 by the spring 33 thus assuring and maintaining the interior mechanism of the box 13 in proper alignment for the axial movement of the shaft 15, as aforesaid.

When it is desired to set the automobile in forward motion, it is desirous, of course, to place the gear shift transmission mechanism 23 in "low" gear. This is accomplished by moving the shaft 15 in an upward direction by means of the hand lever 17 and then oscillating the hand lever 17 in a clockwise direction to assume the positions shown, for example, in Figures 8 to 10, inclusive, the lever 17 moving in a clockwise direction as viewed in Figure 8. When this action occurs, it will be apparent that the actuator arm 18 is likewise moved in a clockwise direction thus forcing the lever 30 toward the lever 31, the latter action taking place due to the impingement of the actuator arm 18 against the curvular side 37 of the notch 35 nearer the pivoted end of the lever 30. Also, it will be observed that when the actuator arm has been so moved that, due to the movement of the lever 30 toward the lever 31, greater force will now be exerted by the spring 33 to thus effectually lock the lever 31 against any movement whatever and, of course, likewise effectually locking the actuator arm 19 against any movement whatever. The next step in placing a car in forward motion is to change the gear position from "low" to "second." This is accomplished by moving the shaft 15 downwardly by means of the hand lever 17 and then rotating in a counterclockwise direction, as viewed for example in Figure 11, the lever 17 to thus likewise cause the lower actuator arm to move also in a counterclockwise direction, likewise as viewed in Figure 11 and causing the mechanism to assume the positions shown in Figures 11 to 13, inclusive. When sufficient headway has been accomplished by the automobile in such "second" gear, the shaft 15 is allowed to remain in the position just described but the hand lever 17 is now moved in a clockwise direction as indicated in Figure 14 thus likewise moving the lower actuator arm 19 also in a clockwise position so that the mechanism will now assume the position indicated in Figures 14 to 16, inclusive.

In order to move the car rearwardly, it will first, of course, be brought to a complete stop and the shaft 15 will be moved upwardly and axially by means of the hand lever 17 whereupon the hand lever 17 will be rotated in a counterclockwise direction as viewed, for example, in Figure 17 of the drawings. The mechanism will now assume the position shown in Figures 17 to 19, inclusive.

It will likewise be apparent that in all cases where the position of the device is changed from one gear selection to another, that there is always a time when the device must assume the "neutral" position above described. The present device is of particular importance in changing from any position where it is desired to move one of the arms 18 or 19 when the other of such arms has last been used or, in other words, when it is necessary to axially move, either upwardly or downwardly, the shifting column 15 at which time it is imperative that the interior mechanisms of the box 13 must be in perfect alignment. Such perfect alignment is secured by means of the levers 30 maintaining the arms 18 and 19 in perfectly parallel radially extending position with relation to each other due to the action of the spring 33 forcing the levers 30 and 31 respectively against the arms 18 and 19 and the further action of the rounded sides 37 of the notches 35 and 36 causing the arms 18 and 19 to center themselves in such notches 35 and 36, respectively.

While but one form of the invention has been shown and described herein, it will be readily apparent to those skilled in the art that many minor modifications may be made without departing from the spirit of the invention or the scope of the appended claims.

What is claimed is:

1. In combination with a transmission shift box having a pair of radially extending actuating arms extending therefrom in spaced parallel relation, each of said arms having a neutral position, the provision of a bracket attached to said box, and means carried by said bracket for automatically aligning said arms in angular registry with each other when said arms are moved to their neutral positions, said bracket being L-shaped and comprising a standard affixed to said box and a shelf extending between said arms, and said means comprising a pair of levers each pivotally mounted at one end upon one side portion of said shelf and each having a notch for receiving one of said arms therein, and a spring interconnecting said levers and urging the same into frictional contact with their adjacent arms.

2. A device as defined in claim 1 wherein each of said levers is provided with an opening adjacent its free end, and wherein said spring comprises a U-shaped body and a laterally extending foot integrally formed at each end of said body, said feet each positioned in one of said openings.

3. A device as defined in claim 1 wherein said arms extend across the juncture between said shelf and said standard, and wherein said levers are each pivoted to a corner portion of the free end of said shelf and extend toward and beyond said juncture.

4. In combination with a transmission shift box having a pair of radially extending actuating arms extending therefrom in spaced parallel relation, each of said arms having a neutral position, the provision of a bracket attached to said box, and means carried by said bracket for automatically aligning said arms in angular registry with each other when said arms are moved to their neutral positions, said bracket being L-shaped and comprising a standard affixed to said box and a shelf extending between said arms, and said means comprising a pair of levers each pivotally mounted at one end upon one side portion of said shelf and each having a notch for receiving one of said arms therein, and a spring interconnecting said levers and urging the same into frictional contact with their adjacent arms, said notches each being generally U-shaped and provided with convexly curved sides.

5. A device as defined in claim 4 wherein each of said levers is provided with an opening adjacent its free end, and wherein said spring comprises a U-shaped body and a laterally extending foot integrally formed at each end of said body, said feet each positioned in one of said openings.

6. A device as defined in claim 4 wherein said arms extend across the juncture between said shelf and said standard, and wherein said levers are each pivoted to a corner portion of the free end of said shelf and extend toward and beyond said juncture.

References Cited in the file of this patent

UNITED STATES PATENTS 2,661,630   Thompson _____ Dec. 8, 1953

FOREIGN PATENTS 966,844   France _____ Mar. 15, 1950